United States Patent
Chirashnya et al.

(10) Patent No.: US 7,113,988 B2
(45) Date of Patent: Sep. 26, 2006

(54) PROACTIVE ON-LINE DIAGNOSTICS IN A MANAGEABLE NETWORK

(75) Inventors: Igor Chirashnya, Haifa (IL); Leah Shalev, Zichron Yaacov (IL); Kirill Shoikhet, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 09/893,006

(22) Filed: Jun. 28, 2001

(65) Prior Publication Data

US 2002/0019870 A1   Feb. 14, 2002

Related U.S. Application Data

(60) Provisional application No. 60/214,971, filed on Jun. 29, 2000.

(51) Int. Cl.
*G06F 15/173* (2006.01)
(52) U.S. Cl. ............... 709/224; 709/203; 709/223
(58) Field of Classification Search .............. None
See application file for complete search history.

(56) References Cited

U.S. PATENT DOCUMENTS

| | | | |
|---|---|---|---|
| 5,528,516 A | 6/1996 | Yemini et al. | |
| 6,076,083 A | 6/2000 | Baker | |
| 6,208,955 B1* | 3/2001 | Provan et al. | 703/20 |
| 6,415,276 B1* | 7/2002 | Heger et al. | 706/52 |
| 6,535,865 B1 | 3/2003 | Skaaning et al. | |
| 6,691,249 B1 | 2/2004 | Barford et al. | |

FOREIGN PATENT DOCUMENTS

| | | |
|---|---|---|
| JP | 2001-75808 A | 3/2001 |
| JP | 2001-318804 A | 11/2001 |

OTHER PUBLICATIONS

Sampath Srinivas, "Building Diagnostic Models from Functional Schematics", *Knowledge Systems Laboratory*, Feb. 1994, pp. 1-49. Report No. KSL 94-15.
Adnan Drawiche, "Model-Based Diagnosis under Real-World Constraints", UCLA Technical Report # D-105, 2000, pp. 1-19.
Pizza et al., "Optimal Discrimination Between Transient and Permanent Faults", Proceedings of the Third IEEE High Assurance System Engineering Symposium, 1998.
Cowell et al, "Probabilistic Networks and Expert Systems", Springer-Verlag, New York, 1999.
Madigan et al., "Graphical Explanation in Belief Networks", *Journal of Computational and Graphical Statistics 6*, 1997, pp. 160-181.

(Continued)

*Primary Examiner*—Bunjob Jaroenchonwanit
*Assistant Examiner*—Dohm Chankong
(74) *Attorney, Agent, or Firm*—Browdy and Neimark, PLLC

(57) ABSTRACT

A method for diagnosis of a system made up of a plurality of interlinked modules includes receiving an alarm from the system indicative of a fault in one of the modules. Responsive to the alarm, a causal network is constructed associating the fault with malfunctions in one or more of the modules that may have led to the fault and relating a conditional probability of the fault to respective probabilities of the malfunctions. Based on the alarm and the causal network, at least one of the probabilities of the malfunctions is updated. A diagnosis of the alarm is proposed responsive to the updated probabilities.

84 Claims, 9 Drawing Sheets

OTHER PUBLICATIONS

Drudzel, "Qualitative Verbal Explanations in Bayesian Belief Networks", *Artificial Intelligence and Simulation of Behavior Quarterly*, 1996, pp. 43-54, vol. 94.

http://www.smARTS.COM/code_wpapers_highspeed.html, Dec. 21, 1999.

http://www.smARTS.COM/code_wpapers_root.html, Dec. 21, 1999.

http://www.smARTS.COM/in_apps_snmp.html. Dec. 21, 1999.

* cited by examiner

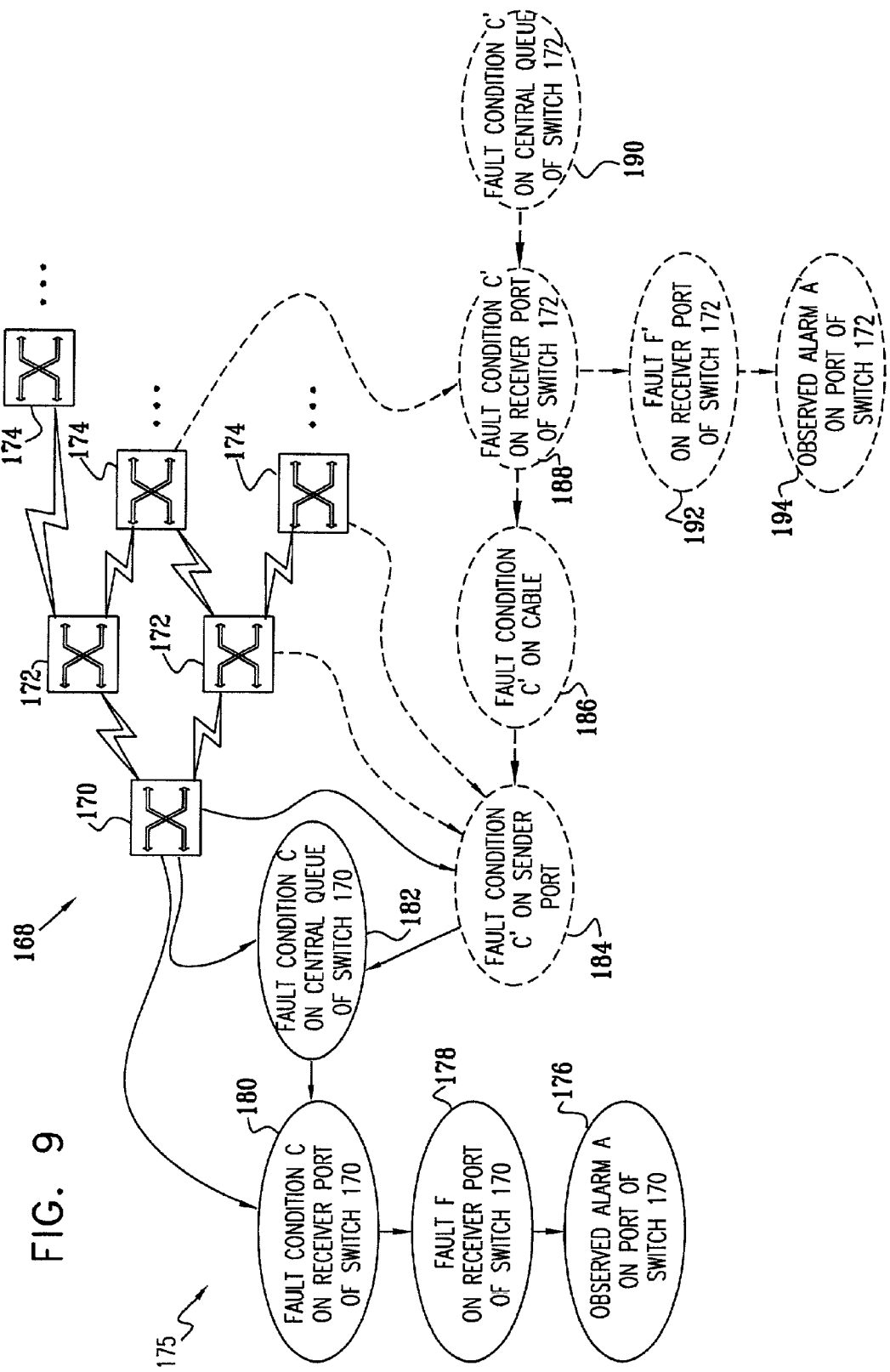

PROACTIVE ON-LINE DIAGNOSTICS IN A MANAGEABLE NETWORK

CROSS-REFERENCE TO RELATED APPLICATIONS

This application claims the benefit of U.S. Provisional Patent Application No. 60/214,971, filed Jun. 29, 2000, which is incorporated herein by reference.

FIELD OF THE INVENTION

The present invention relates generally to methods and systems for fault diagnosis in communication networks, and specifically to methods for identifying faulty components in such networks while normal communication activity is going on.

BACKGROUND OF THE INVENTION

The complexity of computer networks continues to grow, and the levels of reliability, availability and service required of these networks continue to rise, as well. These factors place an increasing burden on diagnostic systems that are used in computer networks to identify and isolate network faults. In order to avoid failures that may severely interfere with network activity, it is important to detect intermittent and sporadic problems that are predictive of incipient failures and to pinpoint the devices that are causing the problems. To maintain high availability of the network, these problems should be identified while the network is on-line and running in a normal activity mode. Service personnel can then be instructed to replace faulty elements before they fail completely.

Modern networks typically provide large volumes of diagnostic information, such as topology files, system-wide error logs and component-specific trace files. Analyzing this information to identify network faults is beyond the capabilities of all but the most skilled network administrators. Most automated approaches to network diagnostics attempt to overcome this problems by framing expert knowledge in the form of if-then rules, which are automatically applied to the diagnostic information. Typically, the rules are heuristic, and must be crafted specifically for the system to which they are to be applied. As a result, the rules themselves are difficult to devise and cannot be applied generally to all error conditions that may arise. Such rules are not globally applicable and must generally be updated when the system configuration is changed.

Model-based diagnostic approaches begin from a functional model of the system in question and analyze it to identify faulty components in the case of malfunction. Functional models (also known as forward or causal models) are often readily available as part of system specifications or reliability analysis models. Developing such a model is typically a straightforward part of the system design or analysis process. Thus, creating the model does not require that the designer be expert in diagnosing system faults. Rather, automated algorithms are applied to the functional model in order to reach diagnostic conclusions. As long as the system model is updated to reflect configuration changes, these algorithms will automatically adapt the diagnostics to the changes that are made.

Switched computing and communication networks, such as System Area Networks (SANs), pose particular challenges for diagnostic applications in terms of their complexity and inherent uncertainties. The complexity has to do with the large numbers of components involved, the existence of multiple, dynamic paths between devices in the network, and the huge amount of information that these networks carry. The uncertainties stem, inter alia, from the fact that alarm messages are carried through the network in packet form. As a result, there may be unknown delays in alarm transmission, leading to alarms arriving out of order, and even loss of some alarm packets.

One paradigm known in the art for model-based diagnostics in the presence of uncertainty is Bayesian Networks. Cowell et al. provide a general description of Bayesian Network theory in *Probabilistic Networks and Expert Systems* (Springer-Verlag, N.Y., 1999), which is incorporated herein by reference. A Bayesian Network is a directed, acyclic graph having nodes corresponding to the domain variables, with conditional probability tables attached to each node. When the directions of the edges in the graph correspond to cause-effect relationships between the nodes, the Bayesian Network is also referred to as a causal network. The absence of an edge between a pair of nodes represents an assumption that the nodes are conditionally independent. The product of the probability tables gives the joint probability distribution of the variables. The probabilities are updated as new evidence is gathered regarding co-occurrence of faults and malfunctions in the system under test. When the diagnostic system receives a new alarm or set of alarms, it uses the Bayesian Network to automatically determine the most probable malfunctions behind the alarm.

U.S. Pat. No. 6,076,083, whose disclosure is incorporated herein by reference, describes an exemplary application of Bayesian Networks to diagnostics of a communication network. The communication network is represented as a Bayesian Network, such that devices and communication links in the communication network are represented as nodes in the Bayesian Network. Faults in the communication network are identified and recorded in the form of trouble tickets, and one or more probable causes of the fault are given based on the Bayesian Network calculations. When a fault is corrected, the Bayesian Network is updated with the knowledge learned in correcting the fault. The updated trouble ticket information is used to automatically update the appropriate probability matrices in the Bayesian Network. The Bayesian Network of U.S. Pat. No. 6,076,083 is static and makes no provision for changes in the configuration of the communication network. Furthermore, because the Bayesian Network models the entire communication network, it quickly becomes computationally intractable when it must model a large, complex switched network.

Another approach to the application of Bayesian Networks to fault diagnosis in computer systems is described by Pizza et al., in "Optimal Discrimination between Transient and Permanent Faults," *Proceedings of the Third IEEE High Assurance System Engineering Symposium* (1998), which is incorporated herein by reference. The authors suggest applying the principles of reliability theory to discriminating between transient faults and permanent faults in components of a computer system. Reliability theory predicts the probability of failure of a given device in terms of failure rate or failure distribution over time (in terms such as Mean Time Between Failures—MTBF). Standard reliability theory techniques are based on sampling device performance under known conditions. In the scheme proposed by Pizza et al., on the other hand, the probabilities of permanent and transient faults of the system components are estimated and updated by inference using a Bayesian Network. This scheme is of only limited practical applicability, however, since in order to arrive at an exact and optimal decision as to failure probability, it looks at each module in the computer system in isolation, without error propagation from one module to another. This is not an assumption that can reasonably be made in real-world switched networks.

SUMMARY OF THE INVENTION

Preferred embodiments of the present invention combine Bayesian Networks and reliability theory to provide diagnostic methods and systems that are capable of dealing in a realistic, efficient way with large, complex switched networks. The diagnostic system maintains local fault models for the devices in the network, along with up-to-date topology information regarding the network as a whole. The local fault models include estimated malfunction rates of modules in the network, which are expressed in reliability theory terms. When an alarm (or sequence of alarms) is received from the network, the diagnostic system uses the local fault models, estimated malfunction rates and topology information to build a Bayesian Network expressing the possible causes of the alarm and their probabilities. The malfunction rate estimates are then updated based on the observed alarms and their times of arrival. When the estimated malfunction rate of a given module exceeds a certain threshold, the diagnostic system declares the module to be fault-suspect, and issues a recommendation to a user of the system to test or replace the suspect module.

Thus, unlike model-based diagnostic methods known in the art, preferred embodiments of the present invention use dynamic Bayesian Network models, which are built specifically in response to each alarm or group of alarms that is received. Consequently, these models completely and accurately reflect the actual, current network conditions, without incurring the prohibitive computational costs and memory requirements of maintaining a complete model of the entire network. Any given model generated by the diagnostic system takes into account interaction and error propagation between connected modules, in contrast to the approach of Pizza et al., mentioned above, in which device models can be considered only in isolation. Preferably, in embodiments of the present invention, regular patterns in the network topology, such as cascaded switches, are identified and exploited to limit the size of the Bayesian Network that must be used to properly model error propagation between modules.

In some preferred embodiments of the present invention, the diagnostic system assesses the second-order failure probability of the modules in the network, i.e., it considers both the estimated mean failure rate and the moment (standard deviation) of the probability distribution. Both the mean and the moment of the probability distribution for any given module are updated each time a Bayesian Network is constructed and evaluated with respect to the module. The use of the second-order probability is characteristic of Bayesian Reliability Theory (as distinct from Bayesian Networks). Bayesian Reliability Theory treats failure rate assessment as a process of initial assessment and correction, unlike simpler, first-order sampling-based methods used in diagnostic systems known in the art. The second-order approach is more suitable for diagnostic failure modeling.

Although preferred embodiments are described herein with reference to fault diagnosis in a switched computer network, those skilled in the art will appreciated that the principles of the present invention are similarly applicable to location of faults in other systems, including not only communication networks of other types, but also other sorts of electrical and mechanical systems, as well as medical and financial systems.

There is therefore provided, in accordance with a preferred embodiment of the present invention, a method for diagnosis of a system made up of a plurality of interlinked modules, including:

receiving an alarm from the system indicative of a fault in one of the modules;

responsive to the alarm, constructing a causal network associating the fault with malfunctions in one or more of the modules that may have led to the fault and relating a conditional probability of the fault to respective probabilities of the malfunctions;

based on the alarm and the causal network, updating at least one of the probabilities of the malfunctions; and proposing a diagnosis of the alarm responsive to the updated probabilities.

Preferably, receiving the alarm includes gathering event reports from the plurality of the modules in the system, and extracting the alarm from the event reports, wherein gathering the event reports includes receiving a report of a change in configuration of the system, and wherein constructing the causal network includes constructing the causal network based on the changed configuration. Most preferably, constructing the causal network based on the changed configuration includes maintaining a database in which the configuration is recorded, and updating the database responsive to the report of the change in the configuration, for use in constructing the causal network.

Alternatively or additionally, extracting the alarm includes extracting a sequence of alarms occurring at mutually proximal times, including the alarm indicative of the fault in the one of the modules, and updating the at least one of the probabilities includes processing the sequence of the alarms so as to update the probabilities. Preferably, extracting the sequence of the alarms includes defining respective lifetimes for the alarms, responsive to expected delays in receiving the alarms from the system, and selecting the alarms to extract from the sequence responsive to the respective lifetimes. Most preferably, selecting the alarms to extract includes selecting the alarms that occurred within their respective lifetimes of a time of occurrence of the alarm indicative of the fault in the one of the modules responsive to which the causal network is constructed.

Further additionally or alternatively, constructing the causal network includes defining an expected alarm that would be caused by one of the malfunctions in the one or more of the modules, and processing the sequence of the alarms includes updating the probabilities responsive to an occurrence of the expected alarm in the extracted sequence of alarms.

In a preferred embodiment, the plurality of interlinked modules includes multiple instances of a given one of the modules interlinked in a regular pattern, and constructing the causal network includes defining a template including a group of nodes in the network corresponding to the given one of the modules, and instantiating the template with respect to one or more of the modules responsive to the alarm. Preferably, defining the template includes identifying an expected alarm that would be caused by one of the malfunctions in one of the instances of the given one of the modules, and instantiating the template includes adding an instance of the template to the network responsive to an occurrence of the expected alarm.

Preferably, constructing the causal network includes identifying a local fault condition in the one of the modules in which the fault occurred, and responsive to the local fault condition, linking the fault in the causal network to one of the malfunctions occurring in the one of the modules. Additionally or alternatively, constructing the causal network includes identifying a first fault condition occurring in a first one of the modules due to a connection with a second one of the modules in the system, and responsive to the first fault condition, linking the fault in the causal network with a second fault condition occurring in the second one of the modules. Preferably, linking the fault includes determining that a possible cause of the second fault condition is due a further connection between the second one of the modules and a third one of the modules in the system, and responsive to the further connection, linking the fault in the causal network with a third fault condition occurring in the third one of the modules.

In a preferred embodiment, constructing the causal network includes adding to the causal network multiple occurrences of one of the malfunctions responsive to the respective probabilities of the malfunctions, and linking the fault in the causal network to the multiple occurrences. Preferably, linking the fault to the multiple occurrences includes determining one or more fault conditions that are caused by each of the occurrences, and linking at least some of the fault conditions to the fault.

In a further preferred embodiment, updating the at least one of the probabilities of the malfunctions includes assessing a mean time between failures of the one or more of the modules.

Preferably, the probabilities of the malfunctions are defined in terms of a probability distribution having a mean and a moment, and updating the at least one of the probabilities includes reassessing the mean and the moment of the distribution. Most preferably, the probability distribution includes a failure rate distribution, and wherein reassessing the mean and the moment includes updating the failure rate distribution using a Bayesian Reliability Theory model.

Preferably, proposing the diagnosis includes comparing one or more of the updated probabilities to a predetermined threshold, and invoking diagnostic action when the one of the probabilities exceeds the threshold. Typically, invoking the diagnostic action includes notifying a user of the system of the diagnosis, wherein notifying the user includes providing an explanation of the diagnosis based on the causal network. Additionally or alternatively, invoking the diagnostic action includes performing a diagnostic test to verify the malfunctions, wherein the test is selected responsive to the one of the probabilities exceeding the threshold. Preferably, the causal network is modified responsive to a result of the diagnostic test.

There is also provided, in accordance with a preferred embodiment of the present invention, a method for diagnosis of a system made up of a plurality of interlinked modules, including:

constructing a causal network associating a fault in one of the modules with malfunctions in two or more of the modules that may have led to the fault and relating a conditional probability of the fault to respective probability distributions of the malfunctions;

responsive to an alarm from the system indicative of the fault, updating the probability distributions of the malfunctions; and proposing a diagnosis of the alarm responsive to the updated probabilities.

There is additionally provided, in accordance with a preferred embodiment of the present invention, apparatus for diagnosis of a system made up of a plurality of interlinked modules, the apparatus including a diagnostic processor, which is coupled to receive an alarm from the system indicative of a fault in one of the modules and which is arranged, responsive to the alarm, to construct a causal network associating the fault with malfunctions in one or more of the modules that may have led to the fault and relating a conditional probability of the fault to respective probabilities of the malfunctions, and based on the alarm and the causal network, to update at least one of the probabilities of the malfunctions so as to propose a diagnosis of the alarm responsive to the updated probabilities.

Preferably, the apparatus includes a memory, containing a database in which the configuration is recorded, and the processor is coupled to update the database responsive to the report of the change in the configuration, for use in constructing the causal network.

Further preferably, the apparatus includes a user interface, wherein the processor is coupled to notify a user of the system of the diagnosis via the user interface.

There is further provided, in accordance with a preferred embodiment of the present invention, apparatus for diagnosis of a system made up of a plurality of interlinked modules, the apparatus including a diagnostic processor, which is arranged to construct a causal network associating a fault in one of the modules with malfunctions in two or more of the modules that may have led to the fault and relating a conditional probability of the fault to respective probability distributions of the malfunctions, and responsive to an alarm from the system indicative of the fault, to update the probability distributions of the malfunctions so as to propose a diagnosis of the alarm responsive to the updated probabilities.

There is moreover provided, in accordance with a preferred embodiment of the present invention, a computer software product for diagnosis of a system made up of a plurality of interlinked modules, the product including a computer-readable medium in which program instructions are stored, which instructions, when read by a computer, cause the computer to receive an alarm from the system indicative of a fault in one of the modules and, responsive to the alarm, to construct a causal network associating the fault with malfunctions in one or more of the modules that may have led to the fault and relating a conditional probability of the fault to respective probabilities of the malfunctions, and based on the alarm and the causal network, to update at least one of the probabilities of the malfunctions so as to propose a diagnosis of the alarm responsive to the updated probabilities.

There is furthermore provided, in accordance with a preferred embodiment of the present invention, a product for diagnosis of a system made up of a plurality of interlinked modules, the product including a computer-readable medium in which program instructions are stored, which instructions, when read by a computer, cause the computer to construct a causal network associating a fault in one of the modules with malfunctions in two or more of the modules that may have led to the fault and relating a conditional probability of the fault to respective probability distributions of the malfunctions, and responsive to an alarm from the system indicative of the fault, to update the probability distributions of the malfunctions so as to propose a diagnosis of the alarm responsive to the updated probabilities.

The present invention will be more fully understood from the following detailed description of the preferred embodiments thereof, taken together with the drawings in which:

BRIEF DESCRIPTION OF THE DRAWINGS

FIG. 9 is a graph illustrating a method for construction of a Bayesian Network that exploits regularities in a communication network being modeled, in accordance with a preferred embodiment of the present invention.

DETAILED DESCRIPTION OF PREFERRED EMBODIMENTS

Figure 1:
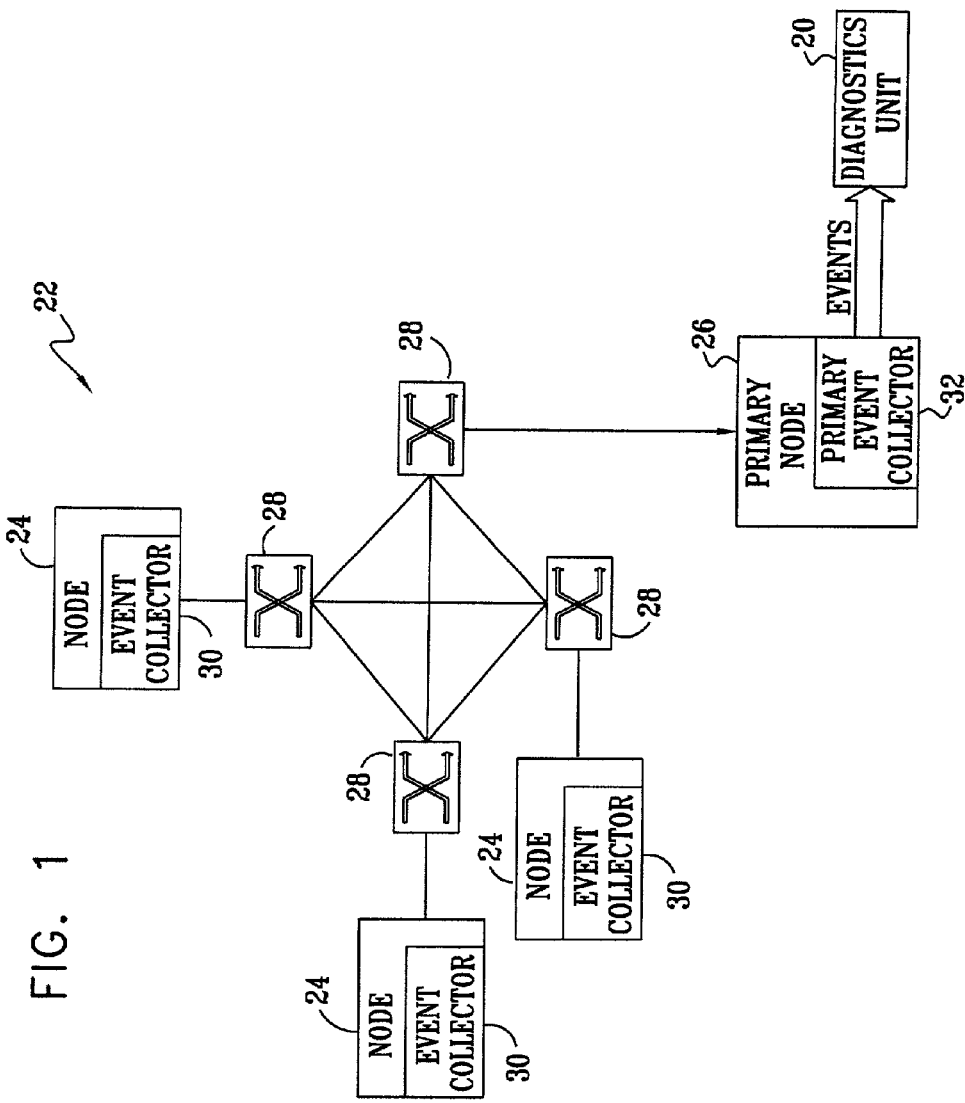
FIG. 1 is a block diagram that schematically illustrates a manageable computer network with a model-based diagnostic unit, in accordance with a preferred embodiment of the present invention.

FIG. 1 is a block diagram that schematically illustrates a manageable communication network 22 and a diagnostic unit 20 used to monitor the network, in accordance with a preferred embodiment of the present invention. Network 22 typically comprises a system/storage area network (SAN), as is known in the art. In such a network, nodes 24 may comprise servers or other computer processors, input/output (I/O) devices, storage devices or gateways, which are interconnected by switches 28. An example of such a network is the RS/6000 SP system produced by IBM Corporation, of Armonk, N.Y. Network 22 is termed "manageable" in the sense that it provides two key features exploited by diagnostic unit 20: First, the network is monitored for errors and failures, such as packet corruption or devices not responding, and for statistics that may reflect abnormal functionality. Second, the network is configurable, particularly in terms of the ability of a system operator or automatic controller to set device parameters, such as error thresholds used in deciding when to generate an alarm.

Management functions in network 22 are preferably coordinated through one of the nodes that is chosen to serve as a primary node 26. Nodes 24 comprise event collectors 30, which are preferably implemented as software agents running as a part of network management software that runs on all of the nodes. These agents gather system events that occur at their respective nodes, including alarms and configuration changes. Event collectors 30 send these events, in the form of management packets, to a primary event collector 32 running on primary node 26. Event collector 32 passes the stream of events to diagnostic unit 20 for processing, as described below.

Although for the sake of conceptual clarity, diagnostic unit 20 is shown as a separate functional block from primary node 26, in preferred embodiments of the present invention, unit 20 is implemented as a software component running on the primary node. Alternatively, the diagnostic unit software may run on another processor that is physically separate from the primary node, or it may run as a distributed application over a group of the nodes or all of the nodes. The software may be downloaded to the primary node or other processor in electronic form, over network 22, for example, or alternatively, it may be supplied on tangible media, such as CD-ROM.

Figure 2:
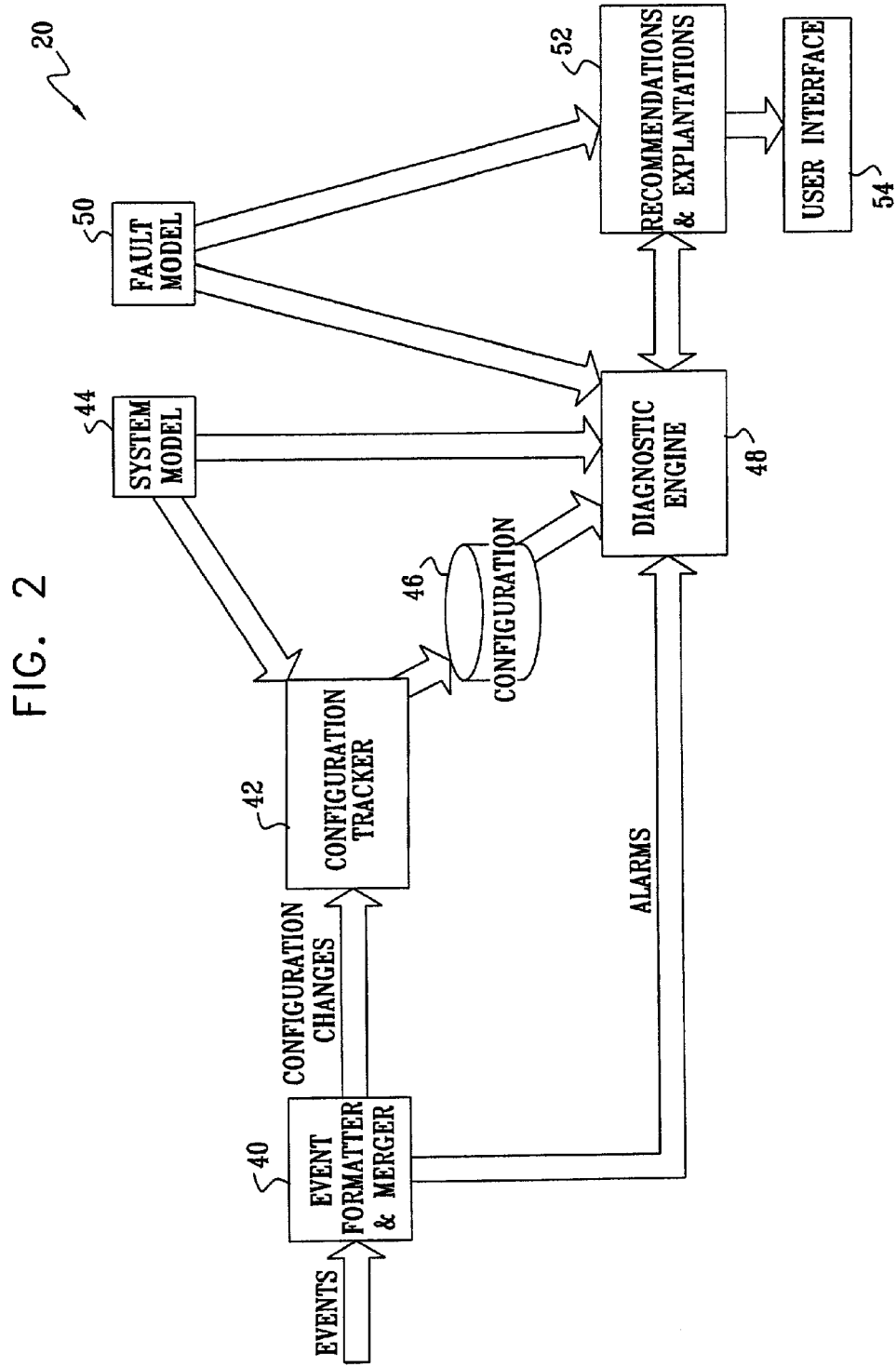
FIG. 2 is a block diagram that schematically shows details of the diagnostic unit of FIG. 1, in accordance with a preferred embodiment of the present invention.

FIG. 2 is a block diagram that schematically shows details of diagnostics unit 20, in accordance with a preferred embodiment of the present invention. Assuming unit 20 is implemented in software, as noted above, the blocks shown in FIG. 2 typically represent functional elements or processes in the diagnostic software package, rather than separate hardware elements. The stream of events collected by primary event collector 32 is received in unit 20 by an event formatter and merger 40. This block arranges the events in order, preferably chronological order based on time stamps applied by event collectors 30 to indicate times of occurrence of the events. Alternatively, the order may be based on time of receipt of the events at primary node 26. As appropriate, formatter and merger 40 reformats the event message information received from collectors 30 in a unified format that can be processed efficiently by subsequent blocks in unit 20. It separates the events into configuration change events and alarms (i.e., error reports), providing two merged streams for processing.

A configuration tracker 42 receives the configuration change events and processes them so as to update a configuration database 46, based on a system model 44. Database 46 is initialized with the complete configuration of network 22 at the time of network start-up, including the currently available modules, their status and topology. The database is subsequently updated automatically, in real time, to reflect any changes that occur, such as addition or removal of nodes 24, or disabling or enabling of ports on switches 28, for example. System model 44 describes the modules used in network 22, including their interconnections and hierarchy. The term "module" is typically used herein to refer to a field-replaceable unit (FRU) or a part of a FRU that can be associated with a particular error report. The differentiation between modules in system model 44 determines the granularity with which diagnostic unit 20 can diagnose and localize the sources of error reports. Preferably, the hierarchical system model is provided to unit 20 by an operator of network 22 in an Extensible Markup Language (XML) format, as is known in the art.

A diagnostic engine 48 receives the alarm stream from event formatter and merger 40 and uses this information to determine and update reliability assessments for the modules associated with each alarm. The reliability assessments are updated by constructing a Bayesian Network on the fly corresponding to each alarm, and using Bayesian Reliability Theory to assess the malfunction rate of various malfunctions on each of the modules. The methods used by the diagnostic engine are described in detail hereinbelow. In constructing the Bayesian Network, the diagnostic engine uses information provided by system model 44 and configuration database 46, as described above. The diagnostic engine also draws on a fault model 50, which describes possible faults in network 22. Faults in this context are abnormal states or behaviors that may occur in a given module due to a local problem or unexpected input.

Fault model 50 is preferably provided by the network operator, most preferably in XML format. A sample DTD (Document Type Definition) for the fault model is attached hereto as Appendix A. It typically contains global fault information, along with individual fault models for all of the basic modules in the system model. These basic modules are the modules at the lowest level in the module hierarchy.

The global fault information in fault model 50 describes all types of possible malfunctions in network 22 and their expected rates. The term "malfunction" in this context refers to the root cause of some fault in a module. When a fault is detected in a module, it may be due to a malfunction having occurred in the module itself, or to a malfunction in another module having propagated in communication traffic through the network to the module at which the fault was detected. The malfunction probabilities in fault model 50 are typically expressed in terms of failure rates, such as estimated mean time between failures (MTBF). The estimated rates are preferably accompanied by a measure of confidence in the estimate, expressed in terms of a standard deviation (or first moment) of the probability distribution. The malfunction rate assessments can be described by a normal distribution on a logarithmic time scale. Thus, for example, a malfunction rate assessment of (10,1) in units of seconds indicates that the mean time between malfunction occurrences is $10^{10}$ s, with a probability of 0.95 that the actual time between occurrences is in the interval $[10^8, 10^{12}]$ s. Diagnostic engine 48 updates both the mean and the standard deviation by inference as it processes the alarms that it receives from network 22.

The individual fault model for each basic module includes the following information:

For each malfunction that may occur in the module, whether it is detected by the module itself, leading to generation of an alarm by the module, and whether the malfunction causes fault conditions on the module's output. Fault conditions are the consequences of the occurrence of a malfunction that lead to the appearance of a fault, i.e., of an abnormal state or behavior of a module, as noted above. A fault condition in a module that causes a fault on the module itself is referred to herein as a "local fault condition." A fault condition on the module output that causes an abnormal input state on another module is referred to as a "connection fault condition."

For each fault condition that may appear at the input to the module, whether the condition is propagated by the module, detected by it, or both.

For each detected fault condition, what alarms the module reports.

A recommendation and explanation generator 52 receives the malfunction assessments computed by diagnostic engine 48, and compares the assessments for the different modules in network 22 to expected, baseline values held in fault model 50. When the failure rate assessment for a given module is significantly higher than its baseline value, generator 52 typically recommends to the user to take further diagnostic action or to replace the FRU containing the module. Criteria for making such recommendations are described further hereinbelow. The recommendations are presented via a user interface 54. Preferably the user interface also allows the user to input queries to the recommendation and explanation generator, and in response to receive a comprehensive explanation of the rationale for the recommendation. The explanation is preferably generated based on the Bayesian Network constructed by diagnostic engine 48, using methods of generating explanations that are known in the art. Exemplary methods for this purpose are described by Druzdel, in "Qualitative Verbal Explanations in Bayesian Belief Networks," *Artificial Intelligence and Simulation of Behavior Quarterly* 94 (1996), pages 43–54; and by Madigan et al., in "Explanation in Belief Networks," *Journal of Computational and Graphical Statistics* 6, pp. 160–181 (1997). Both of these publications are incorporated herein by reference.

Figure 3:
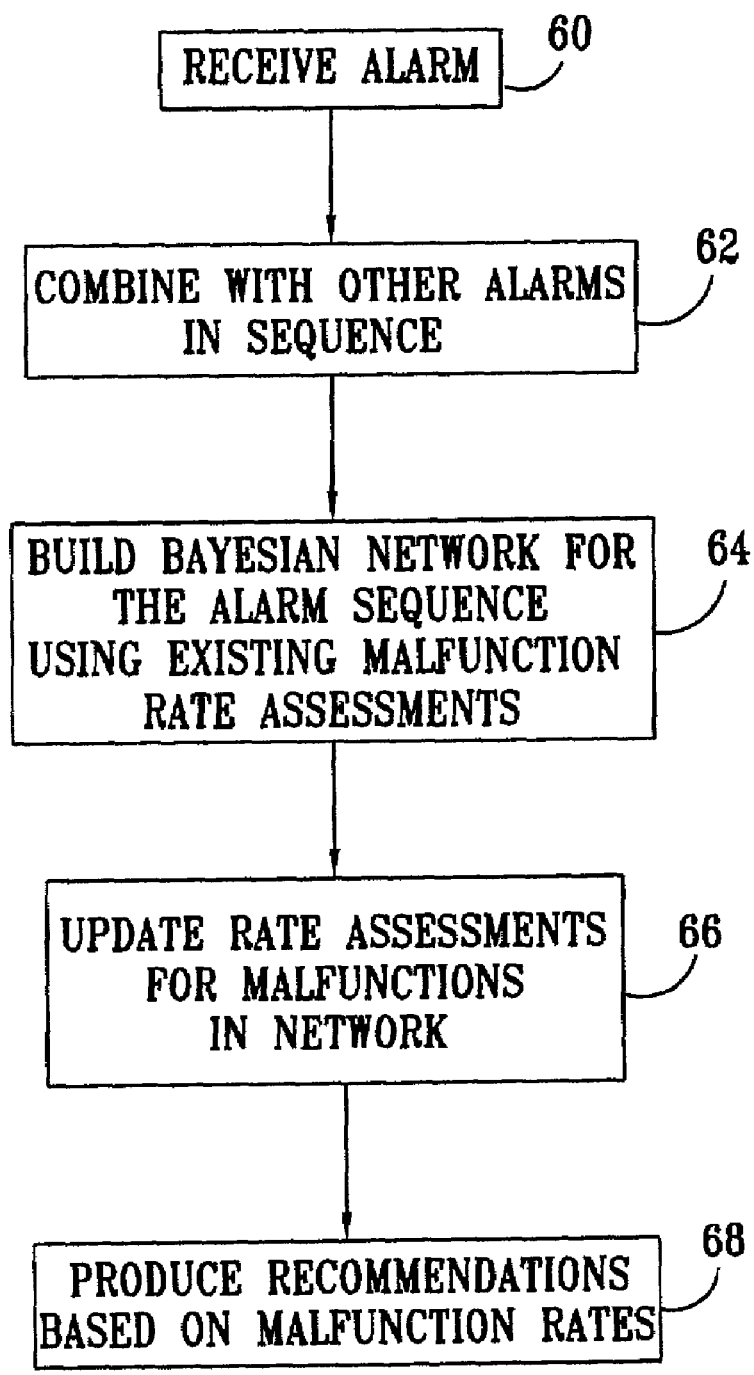
FIG. 3 is a flow chart that schematically illustrates a method for network diagnostics, in accordance with a preferred embodiment of the present invention.

FIG. 3 is a flow chart that schematically illustrates a method for processing alarms and generating recommendations in diagnostic unit 20, in accordance with a preferred embodiment of the present invention. The method is preferably invoked each time diagnostic engine 48 receives an alarm, at an alarm reception step 60. Alternatively, the method may be invoked in response to certain types or groups of alarms. Related alarms occurring at closely-spaced times are preferably combined for processing, at a sequence combination step 62. Methods and considerations applicable to combining alarms in a sequence for collective processing are described in greater detail hereinbelow with reference to FIG. 5.

Engine 48 builds a Bayesian Network (or causal network) applicable to the particular alarm or alarm sequence, at a Network building step 64. A typical Bayesian Network constructed in response to a single alarm is illustrated below in FIG. 4, while the method used to construct the Network is described in detail hereinbelow with reference to FIGS. 6–8. The Bayesian Network is a directional acyclic graph whose nodes correspond to variables including the possible module malfunctions, fault conditions and faults leading up to the alarm in question. The malfunction nodes have specified probability distributions, based on the expected or assessed malfunction rates. The probabilities of the remaining variables are described by probability tables expressing the conditional probabilities of the corresponding variable given its parents in the graph.

Once the graph is constructed, engine 48 updates the probability tables of the nodes based on the alarms in the sequence, at an updating step 66. By correlating different alarms that occur within a specified time frame, the diagnostic engine is able to adjust the conditional probabilities of the nodes, and then to work up the graph to update the malfunction rate assessments of the malfunction nodes. In other words, for any observed alarm A, its probability P(A=true) is set to one. The probability of expected alarms is determined according to their lifetime distributions. The probability tables of the nodes in the Bayesian Network are then recalculated to be consistent with these results. This procedure is referred to in the art of Bayesian Networks as "evidence propagation."

The updated malfunction assessments serve as the basis for recommendation and explanation generator 52 to provide its recommendations to the user, at a recommendation step 68. Preferably, the user defines two threshold levels that are applied to each module: a lower threshold, at which a module is flagged as "fault-suspect," and a higher threshold, at which a suspect module is reclassified as non-suspect. The thresholds relate to the difference between the assessed malfunction rate of each module and its expected failure rate based on system specifications. The user also defines confidence levels for the two thresholds, which are checked against the standard deviation values associated with the malfunction rate assessments of the modules. Thus, for example, the user might specify that a given module is to be flagged as fault-suspect when there is a 10% confidence level that its MTBF (the inverse of the malfunction rate) has dropped below $10^8$. Suppose that after step 66 following a certain alarm sequence, the MTBF assessed for the module is (9,2), using the logarithmic notation described above. In such a case, there is greater than 10% probability that the actual MTBF has dropped below the threshold value of $10^8$, and the module is flagged accordingly. The user typically sets the threshold and confidence levels depending on the cost of replacing or otherwise servicing the FRU in question, weighed against the seriousness of the consequences of a failure of the module while the network is operating.

When a given module is flagged as fault-suspect, recommendation and explanation generator 52 checks to determine whether there is an on-line, non-destructive testing procedure that can be applied to the module in order to verify its status. If so, the generator preferably invokes the procedure automatically or, alternatively, prompts the user to carry out the procedure. The results of this procedure are preferably fed back to diagnostic engine 48, which incorporates the results into the applicable Bayesian Network and updates its malfunction rate assessments accordingly. Following the procedure, generator 52 may determine that the FRU should be replaced. Alternatively, if the MTBF assessments for all of the possible malfunctions associated with the module in question drop below the higher threshold (possibly following reception and processing of additional alarms from network 22), the fault-suspect flag for the module is reset.

Figure 4:
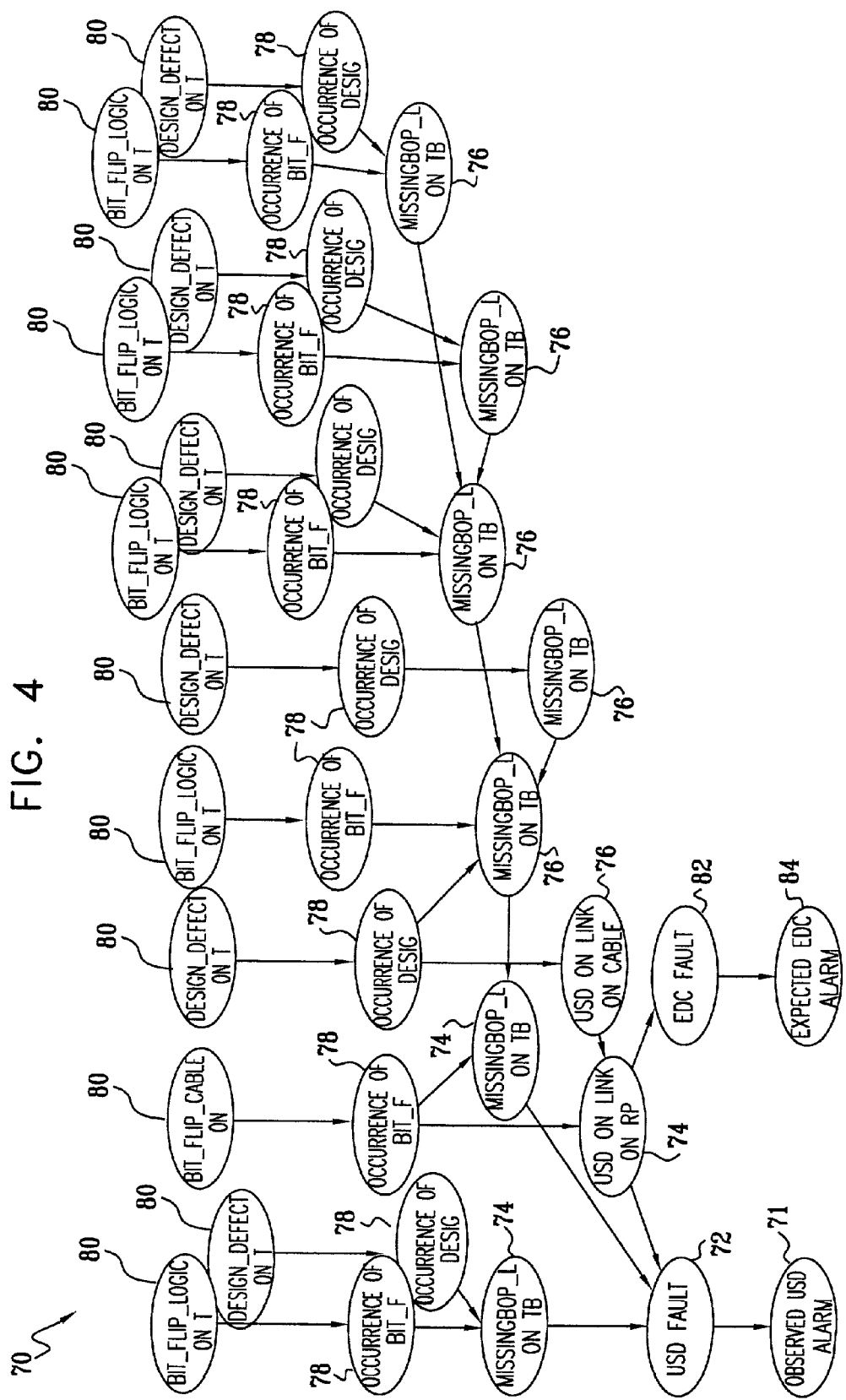
FIG. 4 is a graph showing an exemplary Bayesian Network constructed in response to an alarm in a communication network, in accordance with a preferred embodiment of the present invention.

FIG. 4 is a graph that schematically illustrates an exemplary Bayesian Network 70 generated by diagnostic engine 48, in accordance with a preferred embodiment of the present invention. In this example, engine 48 constructs Network 70 in response to an observed USD (unsolicited data) alarm 71 received at step 60 in the method of FIG. 3. This alarm means that a USD fault 72 occurred, whereby a receiver port in one of switches 28 received data that was not preceded by a legal Beginning Of Packet (BOP) character that should be sent before the data. There are two scenarios described in fault model 50 that could cause this fault:

Corrupted BOP—can occur on any module between the receiver port of the preceding switch in network 22 that sent the data to the switch reporting the error and the actual receiver port on which the error was detected.

Local design defect—a local problem in the reporting switch, other than memory corruption.

To build Network 70, engine 48 begins with the nodes corresponding to observed alarm 71 and fault 72 that caused the alarm. Based on fault model 50, nodes are added to the Network corresponding to fault conditions 74 that could have given rise to fault 72 on the reporting switch. As noted above, these fault conditions include both corrupted bits on the link or in the switch itself, and local design defects that could have caused the corruption. The fault model is then used to add further fault conditions 76 to Network 70 in a recursive fashion. The added fault conditions should include all of the fault conditions on the reporting switch or on the preceding switches connected to it that could have propagated to the reporting switch and thus caused one of fault conditions 74. This process will eventually stop, since the data flow is acyclic, and network 22 is finite. Even so, propagation of the fault condition through the entire communication network 22 would lead to an intractably large Bayesian Network 70. In the present case, propagation stops since switches 28 do not retransmit corrupted data, and the BOP corruption therefore could not have originated any farther away in network 22 than the receiver port of the preceding switch. FIG. 9 below illustrates another technique for limiting the size of Bayesian Networks that are created in accordance with preferred embodiments of the present invention.

For each fault condition 74, 76, engine 48 now adds nodes to Network 70 corresponding to malfunctions 80 that could have caused the condition. The malfunction nodes have failure rate distributions associated with them, indicating the continuous probability of the particular malfunction. To complete Network 70, malfunctions 80 are discretized in terms of Boolean occurrences 78. In other words, any given malfunction 80 is represented by an interval variable having a discretized failure rate distribution. For each interval, the value of the continuous failure rate distribution function is calculated (typically at the middle of the interval), to give the value of the discretized failure rate distribution for the interval. The occurrence variable is used to calculate the probability that the corresponding malfunction occurred. In other words, the occurrence variable is a Boolean variable with a conditional probability table whose entries are given by P(malfunction occurred at time t|a<failure rate<b), wherein t is the time of observation of the observed alarm for which Network 70 has been constructed. The probability tables are preferably determined by the estimated rates of the corresponding malfunction according to a suitable model, such as Poisson arrival statistics. In order to reduce the complexity of Network 70, there is preferably one and only one occurrence node 78 for each malfunction 80. Fault conditions 74, 76 that are caused by the malfunction are connected to the occurrence variable associated with the malfunction.

If the BOP bit corruption occurred on the link between the preceding switch in network 22 and the switch that reported the USD alarm (including corruption occurring on the cable and auxiliary components connecting the cable to the devices), the corrupted bit should also have caused an Error Detection Code (EDC) fault 82. This situation is reflected by the edge added in Network 70 connecting the "USD on Link" fault condition node to the EDC fault node. The EDC fault would have led the switch to issue an EDC alarm 84, in addition to observed USD alarm 71. This EDC alarm 84 is added to Network 70 as an "expected alarm." The arrival or non-arrival of the EDC alarm at diagnostics unit 20 is an important factor in determining the likely cause of the USD alarm and, thus, in adjusting the conditional probabilities for the nodes in Network 70.

Figure 5:
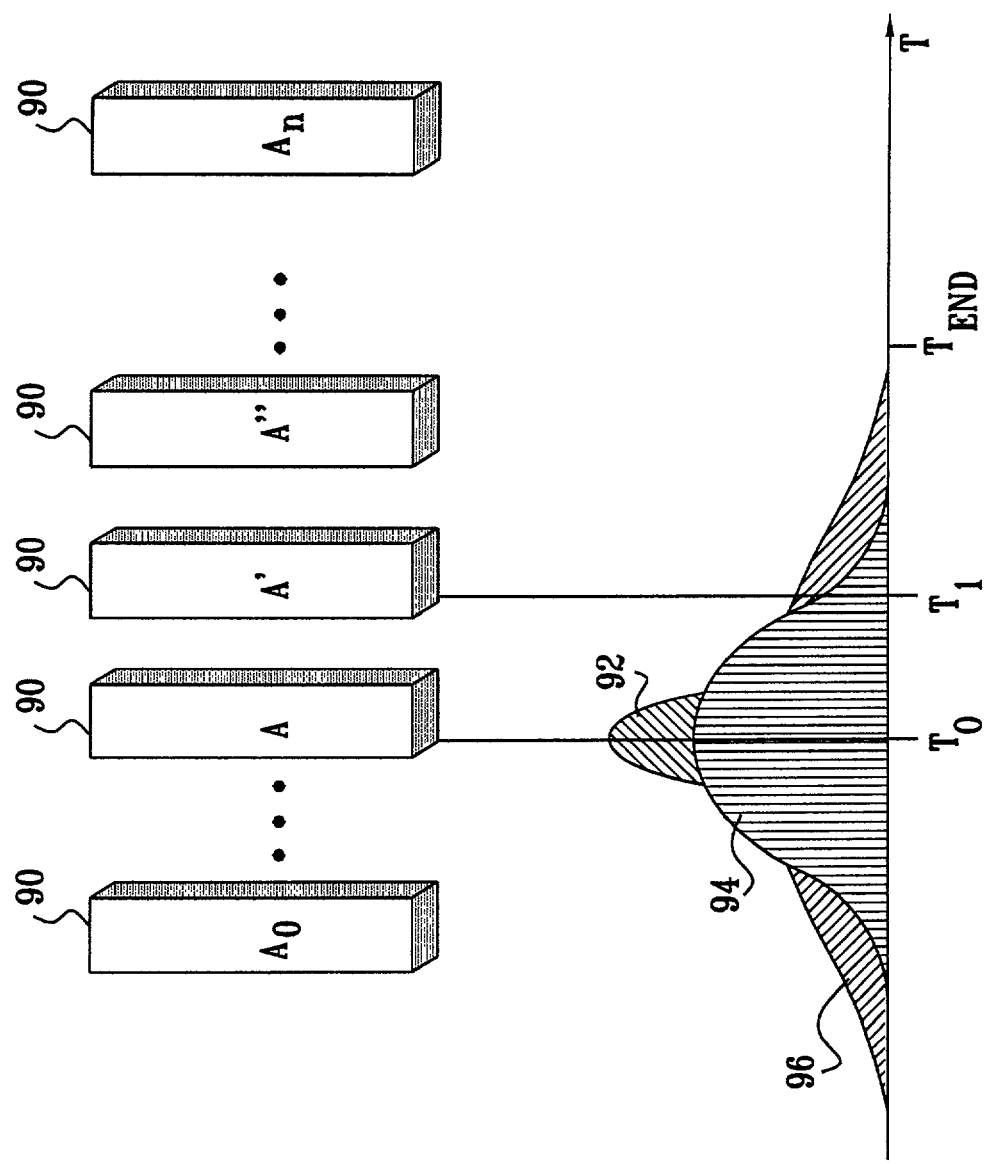
FIG. 5 is a timing diagram that schematically exemplifies a method for processing a sequence of alarms, in accordance with a preferred embodiment of the present invention.

FIG. 5 is a timing diagram that schematically illustrates processing of a sequence of alarms 90 that are received by diagnostic engine 48. These alarms are combined, at step 62 (FIG. 3), for use in building the Bayesian Network for the current alarm and evaluating the probabilities of the nodes in the Network. Collecting the sequence of alarms within an appropriate time window is used, for example, in determining whether or not expected alarm 84 has or has not arrived in conjunction with observed alarm 71. The choice of time window is important in order to properly deal with the uncertainties in alarm arrival time and in the order of the arrival of alarms at diagnostic unit 20.

In order to determine which alarms in a given sequence are to be combined for processing, a normal distribution over time is associated with each type of alarm. This distribution, referred to as the "lifetime distribution" of the alarm, represents the probability over time of the arrival at diagnostic unit 20 of an alarm associated with an event that occurred in network 22 at some time T=0. In other words, referring to FIG. 5, the lifetime distribution of alarm A" gives the estimated probability that when an alarm A is received at time $T_0$, alarm A" generated by the same fault condition as A will be received at time $T_1$. Typically, the lifetime for each alarm type is specified by the user of the diagnostic unit, but the lifetime may alternatively be calculated by the diagnostic unit based on the actual performance of network 22.

In some cases, modules in network 22 do not issue an alarm at every occurrence of a fault, but rather accumulate a number of occurrences and then issue a batch alarm. In this case, it is necessary to multiply the single-alarm lifetime by a threshold factor, so that the lifetime distribution of the alarm is broader. Thus, FIG. 5 shows a narrow distribution 92 for a first alarm type that has no threshold factor, an intermediate distribution 94 for a second alarm type having a low threshold factor, and a broad distribution 96 for a third alarm type having a high threshold factor.

Before processing the Bayesian Network to update the probability tables and malfunction rate assessments (step 66 in the method of FIG. 3), diagnostic engine 48 preferably waits until all of the relevant observed and expected alarms in the sequence have been received. The length of time to wait is determined by the alarm lifetimes. As shown in FIG. 5, engine 48 preferably waits until a time $T_{END}$ at which the arrival probabilities of all expected alarms have dropped below a predetermined threshold. In this case, alarms $A_0, \ldots, A', A''$ would be considered in association with alarm A, but alarm $A_N$, arriving after $T_{END}$, would not be considered.

Figure 6:
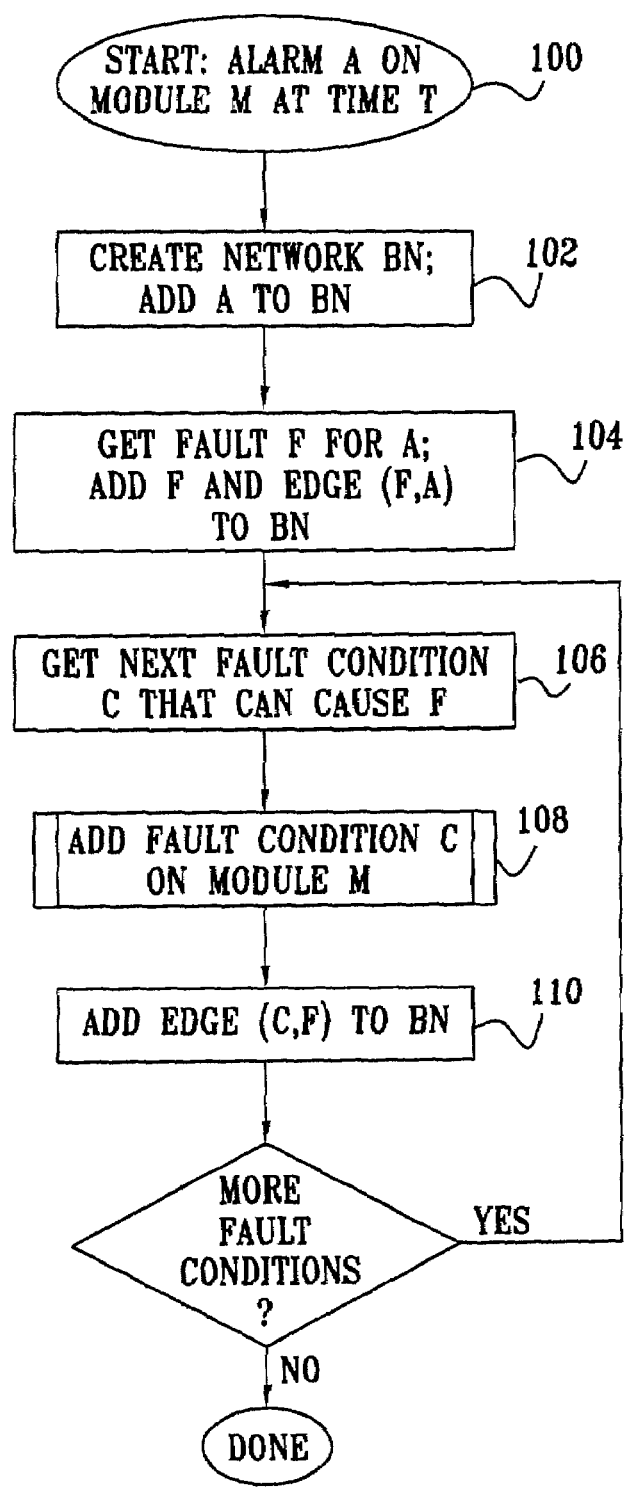
FIG. 6 is a flow chart that schematically illustrates a method for constructing a Bayesian Network in response to an alarm, in accordance with a preferred embodiment of the present invention.

FIG. 6 is a flow chart that schematically shows details of Network building step 64 (in the method of FIG. 3), in accordance with a preferred embodiment of the present invention. This is a recursive method, which is preferably used in constructing Bayesian Networks, such as Network 70 shown in FIG. 4. The method begins with an observed alarm A (such as alarm 71) received on a module M at time T, at an initiation step 100. Diagnostic engine 48 creates a new Bayesian Network BN, at a network creation step 102, and adds a node to BN corresponding to alarm A. The engine looks up the alarm in fault model 50, in order to find the fault F corresponding to A, at a fault finding step 104. A node corresponding to F is added to BN, along with an edge (F,A).

Engine 48 next looks up fault F in fault model 50, in order to find the fault conditions C that could have caused F, at a fault condition finding step 106. As seen in the example of FIG. 4, there are typically several such fault conditions for any given fault. For each such fault condition C, engine 48 carries out a fault condition adding step 108, whereby a node corresponding to condition C on module M is added to BN, and additional fault conditions that could have led to C are explored. Step 108 comprises a recursive routine, which is described in detail hereinbelow with reference to FIG. 7. At this step, nodes and edges are also added corresponding to the malfunctions and malfunction occurrences leading to each fault condition. For each of the fault conditions C that could have caused F, a corresponding edge (C,F) is added to BN, at an edge adding step 110. After all of the possible fault conditions C that could have caused F are processed in this manner, the Bayesian Network is complete.

Figure 7:
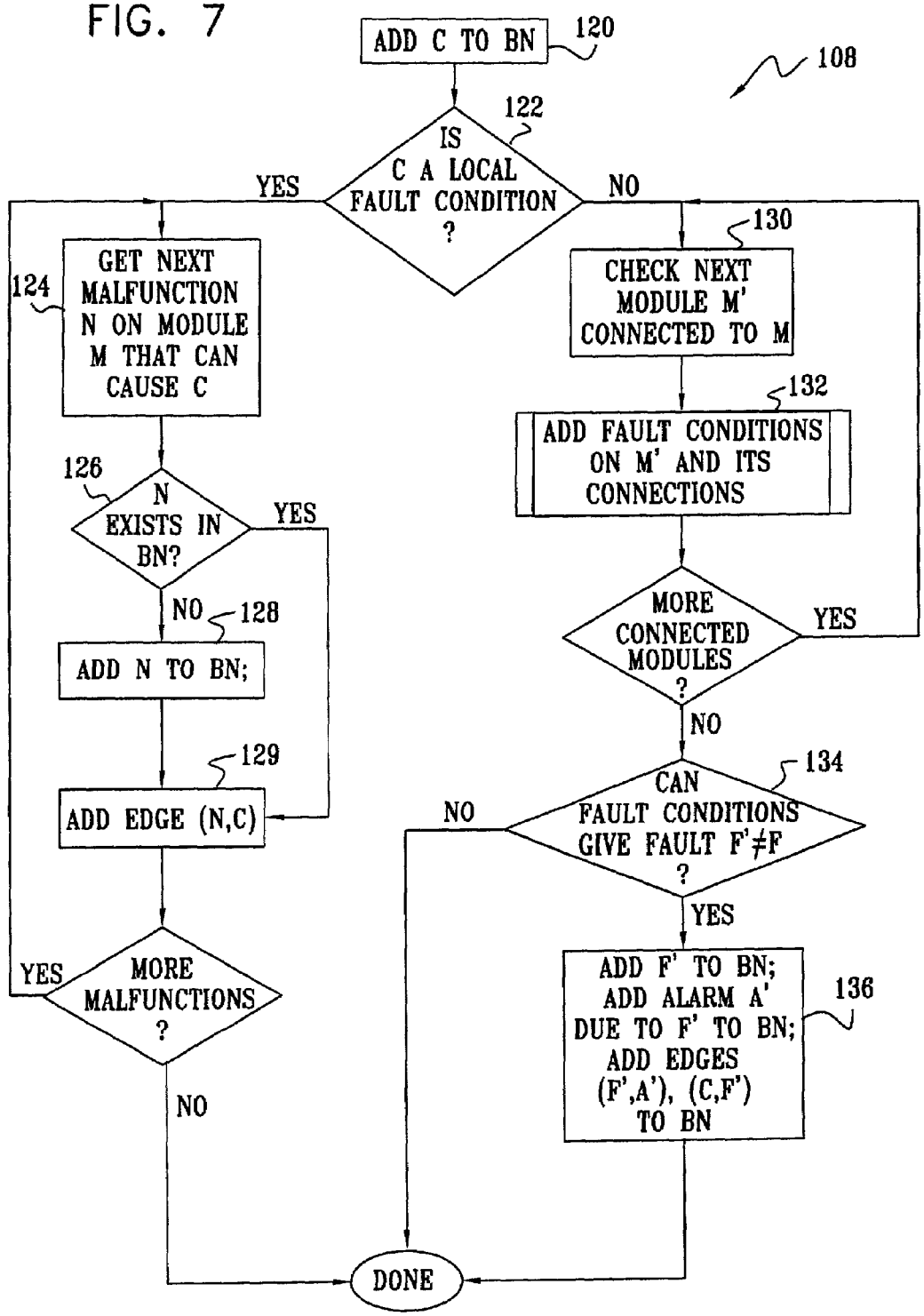
FIGS. 7 and 8 are flow charts that schematically illustrate methods for adding fault conditions to a Bayesian Network constructed in accordance with the method of FIG. 6.

FIG. 7 is a flow chart that schematically shows details of the routine carried out at fault condition adding step 108, in accordance with a preferred embodiment of the present invention. The routine begins with addition of the node corresponding to condition C on module M to BN, at a node adding step 120. Engine 48 checks fault model 50 to determine whether condition C is a local fault condition or a connection fault condition, at a locality checking step 122. For local fault conditions, it is necessary to check only for the malfunctions N on module M that could have caused condition C. Engine 48 looks up the possible malfunctions in fault model 50, at a malfunction finding step 124. For each malfunction N, the engine checks whether there is already a node corresponding to N in BN, at a malfunction checking step 126. If not, a node N is added to BN, at a node adding step 128. An edge (N,C) is then added to the BM, as well, at an edge adding step 129. When all of the possible malfunctions have been added to BN, step 108 is completed.

When a connection fault condition is identified at step 122, the treatment is more complex. In this case, diagnostic engine 48 looks up module M in system model 44 and in configuration database 46 to find the module or modules M' that are connected to M in such a way that they could have caused fault condition C to appear on the connection of M' to M, at a module finding step 130. For each such module M', engine 48 finds and adds to BN the fault conditions on M' and on connections leading to M' that could have caused condition C, at a fault condition adding step 132. This step comprises a routine that is described in detail hereinbelow with reference to FIG. 8. The routine of step 132 forms a part of the recursion in the routine of step 108. The routine continues until nodes and edges have been added to BN corresponding to all of the fault conditions on M' and its connections (including other modules connected to M', and so forth) that could have led to the appearance of fault condition C.

After all of the possible connection fault conditions leading up to fault condition C have been explored, diagnostic engine 48 queries fault model 50 to determine whether these fault conditions could lead to another fault F', besides fault F found at step 104, at an expected fault finding step 134. EDC fault 82 (FIG. 4) is an example of such a fault. A node for each such expected fault F' is added to BN at an fault node addition step 136. In addition, a node corresponding to A', the expected alarm generated by F', is added to BN, along with edges (C,F') and (F',A'). Further edges may also be added to the network corresponding to local fault conditions on other modules and connection fault conditions associated with those modules that could have led to fault F'. The occurrence or non-occurrence of these expected alarms A' within a time, relative to the initial alarm A, that is given by their specified lifetimes is used in filling in the conditional probability tables for the Bayesian Network at step 66 (FIG. 3).

Figure 8:
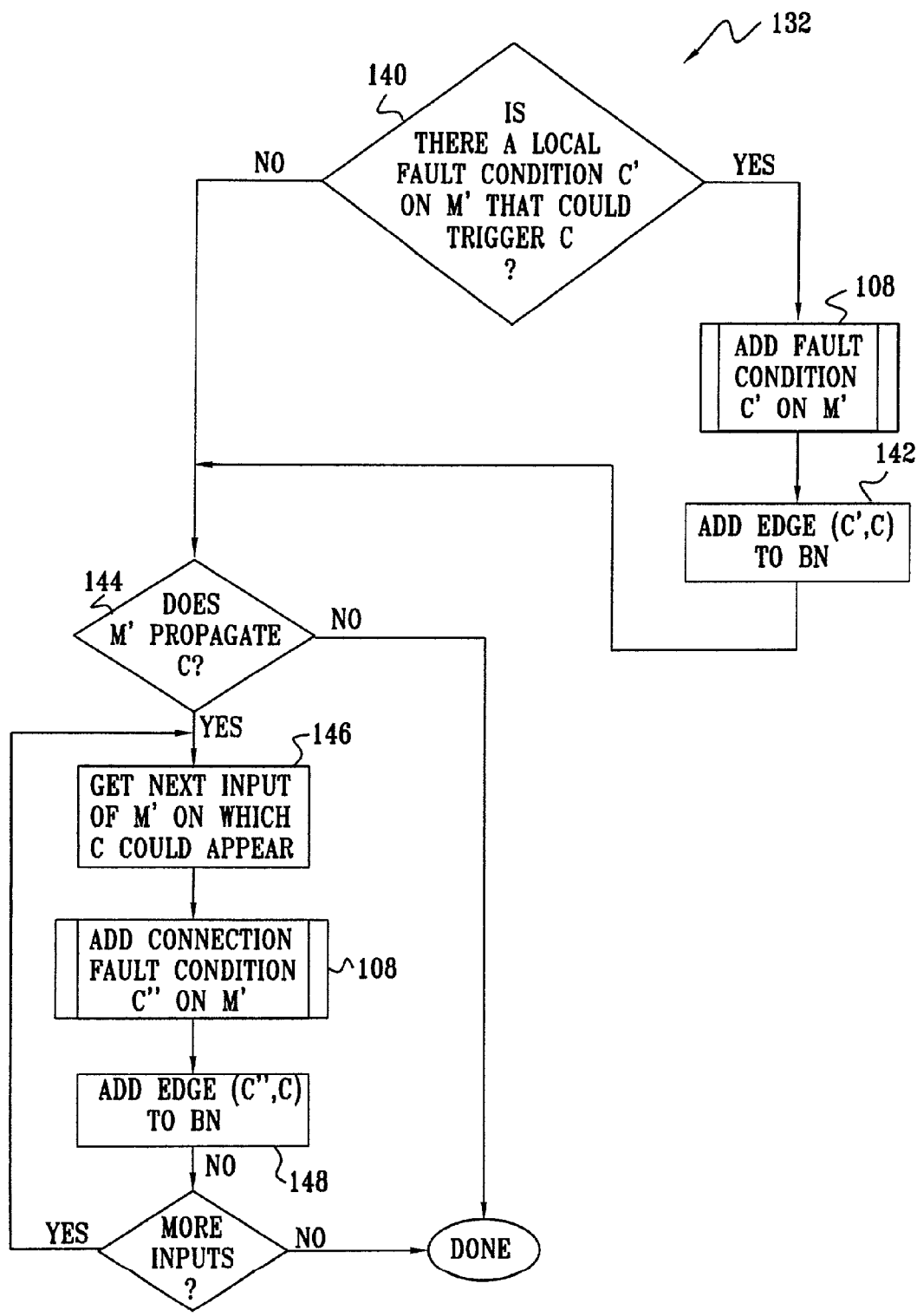

FIG. 8 is a flow chart that schematically shows details of the routine carried out at fault condition adding step 132, in accordance with a preferred embodiment of the present invention. As noted above, this routine is performed for each module M' that is connected to M in such a way that a connection fault condition C could appear on the connection between M' and M. It may also be performed recursively for modules M'' connected to M'. Diagnostic engine 48 first checks fault model 50 to ascertain whether there is a local fault condition C' on M' that could give rise to condition C on the output of M' that is connected to M, at a local fault checking step 140. If there is such a condition C', engine 48 adds a node corresponding to C' on module M' to the Bayesian Network BN, following the routine of step 108, *mutatis mutandis*. This routine also leads to the addition of nodes in BN corresponding to the local malfunctions that could have caused C', with appropriate edges. An edge (C',C) is also added to BN, at an edge addition step 142.

Whether or not local fault conditions C' are found, there may also be connection fault conditions C'' between M' and other modules M'' connected to M' that could have given rise to C', which in turn gave rise to C. This situation is equivalent to saying that M' propagates C. Diagnostic engine 48 ascertains whether M' propagates C by referring to fault model 50, at a propagation step 144. If M' does propagate C, engine 48 queries the fault model to determine the inputs of M' on which connection fault conditions C'' could appear, at an input checking step 146. For each such input, the connection fault condition C" on M' is added to BN. At this step, too, the routine of step 108 is followed, *mutatis mutandis.* For each fault condition C", an edge (C",C) is added to BN, at an edge adding step 148. Step 132 is now done, and construction of the Bayesian Network continues at step 134 until all recursions have been completed.

Because communication network 22 must be finite, the method of constructing the Bayesian Network exemplified by FIGS. 6–8 will always stop eventually. There may be cases, however, in which fault propagation could cause the Bayesian Network to grow very large, even to the point of representing the entire communication network. Such a situation is computationally intractable and should be avoided.

Therefore, in preferred embodiments of the present invention, the growth of the Bayesian Network is contained at step 64 by taking advantage of the inherent regularity of switched networks, such as SANs. Such networks generally have a small number of different module types, which are typically arranged in regular structures. These structures are preferably represented in the Bayesian Network by templates. All instances of a given template will give rise to the same expected alarms under a given fault condition. Although there may be many instances of a given template physically present in the structure of the communication network, a particular instance of the template is preferably instantiated, i.e., added to the Bayesian Network, only when one of its expected alarms has actually been observed.

FIG. 9 is a graph showing a regular structure in a communication network 168 and a corresponding Bayesian Network 175 constructed by diagnostic engine 48, in accordance with a preferred embodiment of the present invention. Communication network 168 in this example comprises cascaded switches 170, 172, 174, wherein switch 170 is in the first tier of the cascade, switches 172 in the second tier, and switches 174 in the third tier. Construction of Bayesian Network 175 begins with a node corresponding to an alarm 176 observed on one of the ports of switch 170. Following the procedure of FIGS. 6–8, nodes are added to Network 175 corresponding to a fault 178 responsible for causing alarm 176 and for a fault condition 180 on a receiver port of switch 170 that caused the fault. This condition may, in turn, have been caused by a fault condition 182 on a central queue of the switch. These are the local faults that could have caused alarm 176 on switch 170.

It is also possible that alarm 176 was caused by fault propagation from one of switches 172 to switch 170. Such fault propagation may be caused by any one of a chain of fault conditions, including a fault condition 184 on a sender port of switch 172, a fault condition 186 on a cable connecting the switches, a fault condition 188 on a receiver port of switch 172, or a fault condition 190 on a central queue of switch 172. As in the case of switch 170, fault condition 188 or 190 on switch 172 will give rise to a fault 192 on the receiver port of switch 172, leading to an expected alarm 194.

Fault conditions 184, 186, 188 and 190, together with fault 192 and expected alarm 194, make up a Bayesian Network template corresponding to one of the switches in communication network 168. (The nodes corresponding to the malfunctions and malfunction occurrences that could lead to the fault conditions are omitted here for the sake of simplicity.) If one of switches 172 has issued expected alarm 194 within appropriate time limits of alarm 176, then there is a probabilistic basis to assume that alarms 176 and 194 are related to one another. In this case, the template corresponding to the switch issuing the alarm is instantiated, i.e., it is added to Bayesian Network 175. If the expected alarm has not occurred, the corresponding switch will have no influence on calculation of the updated malfunction assessments (step 66), and the template can be omitted from the Bayesian Network without compromising the calculation. In this manner, the Bayesian Network constructed in response to any given alarm is kept small and easy to handle computationally. If the template for one of switches 172 is instantiated, diagnostic engine 48 preferably considers the expected alarms corresponding to switches 174, in the third tier, in order to determine whether they should be included in Network 175. Practically speaking, however, it is generally necessary to instantiate only a few templates.

Although preferred embodiments are described herein with reference to fault diagnosis in network 22 using diagnostic unit 20 (with particular examples taken from the inventors' experience with the RS/6000 SP system), those skilled in the art will appreciate that the principles of the present invention are similarly applicable to location of faults in other networks and systems, as well. Most modern communication networks, particularly packet data networks, are manageable, with fault reporting and configuration functions that can be used by a diagnostic system such as unit 20. As long as all of the elements in the network or system are modeled, and data flow among these elements is acyclic, a diagnostic model based on Bayesian Networks and Reliability Theory may be applied, based on the principles of the present invention. This principles are applicable not only to communication and computer networks (and subsystems of such networks), but also to other sorts of electrical and mechanical systems, as well as medical and financial systems.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

FAULT MODEL DTD

```
<?xml encoding="UTF-8"?>
<!ELEMENT Fault_Model_Information    (g_files-list,
                                      g_malfunctions-list,
                                      g_alarms-list,
                                      g_fault-conditions-list,
                                      g_fault-condition-groupings)>
<!ELEMENT g_files-list (g_file)+>
<!ELEMENT g_file EMPTY>
<!ATTLIST g_file
    name CDATA #REQUIRED
    desc CDATA #IMPLIED>
<!ELEMENT g_malfunctions-list (g_malfunction*)>
<!ELEMENT g_malfunction (g_fault-condition-caused*)>
<!ATTLIST g_malfunction
    name CDATA #REQUIRED
    mean CDATA #REQUIRED
    deviation CDATA #REQUIRED>
<!ELEMENT g_fault-condition-caused EMPTY>
<!ATTLIST g_fault-condition-caused
    name CDATA #REQUIRED>
<!ELEMENT g_alarms-list (g_alarm*)>
<!ELEMENT g_alarm EMPTY>
<!ATTLIST g_alarm
    name CDATA #REQUIRED
    number CDATA #REQUIRED
```

APPENDIX A-continued

FAULT MODEL DTD

```
    related-fault CDATA #REQUIRED
    desc CDATA #IMPLIED>
<!ELEMENT g_fault-conditions-list (g_fault-condition*)>
<!ELEMENT g_fault-condition (g_fault-caused*)>
<!ATTLIST g_fault-condition
    name CDATA #REQUIRED
    connection-type (Service-Traffic | Data-Traffic |
    Service-And-Data-Traffic | Sync-Traffic) #REQUIRED>
<!ELEMENT g_fault-caused EMPTY>
<!ATTLIST g_fault-caused
    name CDATA #REQUIRED
    on-input (true | false) #REQUIRED
    locally (true | false) #REQUIRED>
<!ELEMENT g_fault-condition-groupings
    (g_fault-condition-group*)>
<!ELEMENT g_fault-condition-group
    (g_member-fault-condition*, g_fault-condition-group*)>
<!ATTLIST g_fault-condition-group
    name CDATA #REQUIRED>
<!ELEMENT g_member-fault-condition EMPTY>
<!ATTLIST g_member-fault-condition
    name CDATA #REQUIRED>
<!ELEMENT module (malfunctions, reports, triggers,
    (barrier-to | propagates), converts? )>
<!ATTLIST module
    name CDATA #REQUIRED>
<!ELEMENT malfunctions (malfunction*)>
<!ELEMENT malfunction EMPTY>
<!ATTLIST malfunction
    name CDATA #REQUIRED>
<!ELEMENT reports (data-inputs, sync-inputs,
    service-inputs, local)>
<!ELEMENT data-inputs (fault*)>
<!ELEMENT sync-inputs (fault*)>
<!ELEMENT service-inputs (fault*)>
<!ELEMENT local (fault*)>
<!ELEMENT fault EMPTY>
<!ATTLIST fault
    name CDATA #REQUIRED>
<!ELEMENT converts (fault-condition-pair*)>
<!ELEMENT fault-condition-pair EMPTY>
<!ATTLIST fault-condition-pair
    fault-cond-input CDATA #REQUIRED
    fault-cond-output CDATA #REQUIRED>
<!ELEMENT triggers (fault-condition*)>
<!ELEMENT fault-condition EMPTY>
<!ATTLIST fault-condition
    name CDATA #REQUIRED>
<!ELEMENT barrier-to (fault-condition*)>
<!ELEMENT propagates (fault-condition*)>
```

The invention claimed is:

1. A method for diagnosis of a system made up of a plurality of interlinked modules, comprising:
receiving an alarm from the system indicative of a fault in one of the modules;
responsive to the alarm, constructing a causal network associating the fault with malfunctions in one or more of the modules that may have led to the fault and relating a conditional probability of the fault to respective probabilities of the malfunctions;
based on the alarm and the causal network, updating at least one of the probabilities of the malfunctions; and
proposing a diagnosis of the alarm responsive to the updated probabilities,
wherein receiving the alarm comprises gathering event reports from the plurality of the modules in the system, and extracting the alarm from the event reports, and
wherein extracting the alarm comprises extracting a sequence of alarms occurring at mutually proximal times, including the alarm indicative of the fault in the one of the modules, and wherein updating the at least one of the probabilities comprises processing the sequence of the alarms so as to update the probabilities.

2. A method according to claim 1, wherein gathering the event reports comprises receiving a report of a change in configuration of the system, and wherein constructing the causal network comprises constructing the causal network based on the changed configuration.

3. A method according to claim 2, wherein constructing the causal network based on the changed configuration comprises maintaining a database in which the configuration is recorded, and updating the database responsive to the report of the change in the configuration, for use in constructing the causal network.

4. A method according to claim 1, wherein extracting the sequence of the alarms comprises defining respective lifetimes for the alarms, responsive to expected delays in receiving the alarms from the system, and selecting the alarms to extract from the sequence responsive to the respective lifetimes.

5. A method according to claim 4, wherein selecting the alarms to extract comprises selecting the alarms that occurred within their respective lifetimes of a time of occurrence of the alarm indicative of the fault in the one of the modules responsive to which the causal network is constructed.

6. A method according to claim 1, wherein constructing the causal network comprises defining an expected alarm that would be caused by one of the malfunctions in the one or more of the modules, and wherein processing the sequence of the alarms comprises updating the probabilities responsive to an occurrence of the expected alarm in the extracted sequence of alarms.

7. A method according to claim 1, wherein constructing the causal network comprises defining a template comprising a group of nodes in the network corresponding to a category of the modules in the system and an expected alarm that would be caused by one of the malfunctions in the modules in the category, and instantiating the template in the causal network responsive to an occurrence of the expected alarm in the extracted sequence of alarms.

8. A method according to claim 1, wherein the plurality of interlinked modules comprises multiple instances of a given one of the modules interlinked in a regular pattern, and wherein constructing the causal network comprises defining a template comprising a group of nodes in the network corresponding to the given one of the modules, and instantiating the template with respect to one or more of the modules responsive to the alarm.

9. A method according to claim 8, wherein defining the template comprises identifying an expected alarm that would be caused by one of the malfunctions in one of the instances of the given one of the modules, and wherein instantiating the template comprises adding an instance of the template to the network responsive to an occurrence of the expected alarm.

10. A method according to claim 1, wherein constructing the causal network comprises identifying a local fault condition in the one of the modules in which the fault occurred, and responsive to the local fault condition, linking the fault in the causal network to one of the malfunctions occurring in the one of the modules.

11. A method for diagnosis of a system made up of a plurality of interlinked modules, comprising:
receiving an alarm from the system indicative of a fault in one of the modules;
responsive to the alarm, constructing a causal network associating the fault with malfunctions in one or more of the modules that may have led to the fault and relating a conditional probability of the fault to respective probabilities of the malfunctions;

based on the alarm and the causal network, updating at least one of the probabilities of the malfunctions; and proposing a diagnosis of the alarm responsive to the updated probabilities, wherein constructing the causal network comprises identifying a first fault condition occurring in a first one of the modules due to a connection with a second one of the modules in the system, and responsive to the first fault condition, linking the fault in the causal network with a second fault condition occurring in the second one of the modules.

12. A method according to claim 11, wherein linking the fault comprises determining that a possible cause of the second fault condition is due a further connection between the second one of the modules and a third one of the modules in the system, and responsive to the further connection, linking the fault in the causal network with a third fault condition occurring in the third one of the modules.

13. A method for diagnosis of a system made up of a plurality of interlinked modules, comprising:

receiving an alarm from the system indicative of a fault in one of the modules;

responsive to the alarm, constructing a causal network associating the fault with malfunctions in one or more of the modules that may have led to the fault and relating a conditional probability of the fault to respective probabilities of the malfunctions;

based on the alarm and the causal network, updating at least one of the probabilities of the malfunctions; and proposing a diagnosis of the alarm responsive to the updated probabilities, wherein constructing the causal network comprises adding to the causal network multiple occurrences of one of the malfunctions responsive to the respective probabilities of the malfunctions, and linking the fault in the causal network to the multiple occurrences.

14. A method according to claim 13, wherein linking the fault to the multiple occurrences comprises determining one or more fault conditions that are caused by each of the occurrences, and linking at least some of the fault conditions to the fault.

15. A method for diagnosis of a system made up of a plurality of interlinked modules, comprising:

receiving an alarm from the system indicative of a fault in one of the modules;

responsive to the alarm, constructing a causal network associating the fault with malfunctions in one or more of the modules that may have led to the fault and relating a conditional probability of the fault to respective probabilities of the malfunctions;

based on the alarm and the causal network, updating at least one of the probabilities of the malfunctions; and proposing a diagnosis of the alarm responsive to the updated probabilities, wherein updating the at least one of the probabilities of the malfunctions comprises assessing a mean time between failures of the one or more of the modules.

16. A method according to claim 1, wherein the probabilities of the malfunctions are defined in terms of a probability distribution having a mean and a moment, and wherein updating the at least one of the probabilities comprises reassessing the mean and the moment of the distribution.

17. A method according to claim 16, wherein the probability distribution comprises a failure rate distribution, and wherein reassessing the mean and the moment comprises updating the failure rate distribution using a Bayesian Reliability Theory model.

18. A method according to claim 1, wherein proposing the diagnosis comprises comparing one or more of the updated probabilities to a predetermined threshold, and invoking diagnostic action when the one of the probabilities exceeds the threshold.

19. A method according to claim 18, wherein invoking the diagnostic action comprises notifying a user of the system of the diagnosis.

20. A method according to claim 19, wherein notifying the user comprises providing an explanation of the diagnosis based on the causal network.

21. A method according to claim 18, wherein invoking the diagnostic action comprises performing a diagnostic test to verify the malfunctions, wherein the test is selected responsive to the one of the probabilities exceeding the threshold.

22. A method according to claim 21, and comprising modifying the causal network responsive to a result of the diagnostic test.

23. A method for diagnosis of a system made up of a plurality of interlinked modules, comprising:

constructing a causal network associating a fault in one of the modules with malfunctions in two or more of the modules that may have led to the fault and relating a conditional probability of the fault to respective probability distributions of the malfunctions;

responsive to an alarm from the system indicative of the fault, updating the probability distributions of the malfunctions; and proposing a diagnosis of the alarm responsive to the updated probabilities, wherein the two or more of the modules comprise first and second modules, and wherein constructing the causal network comprises identifying a first fault condition occurring in the first module due to a connection in the system with the second module, and responsive to the first fault condition, linking the fault in the causal network with a second fault condition occurring in the second module.

24. A method according to claim 23, wherein updating the probability distributions comprises assessing a mean time between failures of the two or more of the modules.

25. A method according to claim 23, wherein the probability distributions have a mean and a moment, and wherein updating the probability distributions comprises reassessing the mean and the moment of the distribution.

26. A method according to claim 25, wherein the probability distributions comprise failure rate distributions, and wherein reassessing the mean and the moment comprises updating the failure rate distributions using a Bayesian Reliability Theory model.

27. A method according to claim 23, wherein the two or more of the modules comprise the one of the modules in which the fault occurred, and wherein constructing the causal network comprises identifying a local fault condition in the one of the modules, and responsive to the local fault condition, linking the fault in the causal network to one of the malfunctions occurring in the one of the modules.

28. A method according to claim 23, wherein the two or more of the modules comprise a third module, and wherein linking the fault comprises determining that a possible cause of the second fault condition is due a further connection in the system between the second module and the third module, and responsive to the further connection, linking the fault in the causal network with a third fault condition occurring in the third module.

29. Apparatus for diagnosis of a system made up of a plurality of interlinked modules, the apparatus comprising a diagnostic processor, which is coupled to receive an alarm from the system indicative of a fault in one of the modules and which is arranged, responsive to the alarm, to construct a causal network associating the fault with malfunctions in one or more of the modules that may have led to the fault and relating a conditional probability of the fault to respective probabilities of the malfunctions, and based on the alarm and the causal network, to update at least one of the probabilities of the malfunctions so as to propose a diagnosis of the alarm responsive to the updated probabilities, wherein the processor is linked to receive event reports from the plurality of the modules in the system, and to extract the alarm from the event reports, and wherein the processor is coupled to extract a sequence of alarms occurring at mutually proximal times, including the alarm indicative of the fault in the one of the modules, and to process the sequence of the alarms so as to update the probabilities.

30. Apparatus according to claim 29, wherein the event reports comprise a report of a change in configuration of the system, and wherein the processor is arranged to construct the causal network based on the changed configuration.

31. Apparatus according to claim 30, and comprising a memory, containing a database in which the configuration is recorded, and wherein the processor is coupled to update the database responsive to the report of the change in the configuration, for use in constructing the causal network.

32. Apparatus according to claim 29, wherein respective lifetimes are defined for the alarms, responsive to expected delays in receiving the alarms from the system, and wherein the processor is arranged to select the alarms to extract from the sequence responsive to the respective lifetimes.

33. Apparatus according to claim 32, wherein the processor is arranged to select the alarms that occurred within their respective lifetimes of a time of occurrence of the alarm indicative of the fault in the one of the modules responsive to which the causal network is constructed.

34. Apparatus according to claim 29, wherein in constructing the causal network, the processor is arranged to define an expected alarm that would be caused by one of the malfunctions in the one or more of the modules, and wherein the processor is further arranged to update the probabilities responsive to an occurrence of the expected alarm in the extracted sequence of alarms.

35. Apparatus according to claim 29, wherein a template is defined comprising a group of nodes in the network corresponding to a category of the modules in the system and an expected alarm that would be caused by one of the malfunctions in the modules in the category, and wherein the processor is arranged to instantiate the template in the causal network responsive to an occurrence of the expected alarm in the extracted sequence of alarms.

36. Apparatus according to claim 29, wherein the plurality of interlinked modules comprises multiple instances of a given one of the modules interlinked in a regular pattern, and wherein a template is defined comprising a group of nodes in the network corresponding to the given one of the modules, and wherein the processor is arranged to instantiate the template with respect to one or more of the modules responsive to the alarm.

37. Apparatus according to claim 36, wherein the template comprises an expected alarm that would be caused by one of the malfunctions in one of the instances of the given one of the modules, and wherein the processor is arranged to instantiate the template by adding an instance of the template to the network responsive to an occurrence of the expected alarm.

38. Apparatus according to claim 29, wherein the processor is arranged to identify a local fault condition in the one of the modules in which the fault occurred, and responsive to the local fault condition, to link the fault in the causal network to one of the malfunctions occurring in the one of the modules.

39. Apparatus according to claim 29, wherein the processor is arranged to identify a first fault condition occurring in a first one of the modules due to a connection with a second one of the modules in the system, and responsive to the first fault condition, to link the fault in the causal network with a second fault condition occurring in the second one of the modules.

40. Apparatus according to claim 39, wherein the processor is arranged to determine that a possible cause of the second fault condition is due a further connection between the second one of the modules and a third one of the modules in the system, and responsive to the further connection, to link the fault in the causal network with a third fault condition occurring in the third one of the modules.

41. Apparatus according to claim 29, wherein the processor is arranged to add to the causal network multiple occurrences of one of the malfunctions responsive to the respective probabilities of the malfunctions, and to link the fault in the causal network to the multiple occurrences.

42. Apparatus according to claim 41, wherein the processor is arranged to determine one or more fault conditions that are caused by each of the occurrences, and to link at least some of the fault conditions to the fault.

43. Apparatus according to claim 29, wherein the at least one of the probabilities of the malfunctions is expressed as a mean time between failures of the one or more of the modules.

44. Apparatus according to claim 29, wherein the probabilities of the malfunctions are defined in terms of a probability distribution having a mean and a moment, and wherein the processor is arranged to update the mean and the moment of the distribution.

45. Apparatus according to claim 44, wherein the probability distribution comprises a failure rate distribution, and wherein the processor is arranged to update the failure rate distribution using a Bayesian Reliability Theory model.

46. Apparatus according to claim 29, wherein the processor is arranged to compare one or more of the updated probabilities to a predetermined threshold, and to invoke diagnostic action when the one of the probabilities exceeds the threshold.

47. Apparatus according to claim 46, and comprising a user interface, wherein the processor is coupled to notify a user of the system of the diagnosis via the user interface.

48. Apparatus according to claim 47, wherein the processor is arranged to provide via the user interface an explanation of the diagnosis based on the causal network.

49. Apparatus according to claim 46, wherein the diagnostic action comprises a diagnostic test that is performed to verify the malfunctions, wherein the test is selected responsive to the one of the probabilities exceeding the threshold.

50. Apparatus according to claim 49, wherein the processor is arranged to modify the causal network responsive to a result of the diagnostic test.

51. Apparatus for diagnosis of a system made up of a plurality of interlinked modules, the apparatus comprising a diagnostic processor, which is arranged to construct a causal network associating a fault in one of the modules with malfunctions in two or more of the modules that may have led to the fault and relating a conditional probability of the fault to respective probability distributions of the malfunctions, and responsive to an alarm from the system indicative of the fault, to update the probability distributions of the malfunctions so as to propose a diagnosis of the alarm responsive to the updated probabilities wherein the two or more of the modules comprise first and second modules, and wherein the processor is arranged to identify a first fault condition occurring in the first module due to a connection in the system with the second module, and responsive to the first fault condition, to link the fault in the causal network with a second fault condition occurring in the second module.

52. Apparatus according to claim 51, wherein the probability distributions are indicative of a mean time between failures of the two or more of the modules.

53. Apparatus according to claim 51, wherein the probability distributions have a mean and a moment, and wherein the processor is arranged to reassess the mean and the moment of the distribution responsive to the alarm.

54. Apparatus according to claim 53, wherein the probability distributions comprise failure rate distributions, and wherein the processor is arranged to update the failure rate distributions using a Bayesian Reliability Theory model.

55. Apparatus according to claim 51, wherein the two or more of the modules comprise the one of the modules in which the fault occurred, and wherein the processor is arranged to identify a local fault condition in the one of the modules, and responsive to the local fault condition, to link the fault in the causal network to one of the malfunctions occurring in the one of the modules.

56. Apparatus according to claim 51, wherein the two or more of the modules comprise a third module, and wherein the processor is arranged to determine that a possible cause of the second fault condition is due a further connection in the system between the second module and the third module, and responsive to the further connection, to link the fault in the causal network with a third fault condition occurring in the third module.

57. A computer software product for diagnosis of a system made up of a plurality of interlinked modules, the product comprising a computer-readable medium in which program instructions are stored, which instructions, when read by a computer, cause the computer to receive an alarm from the system indicative of a fault in one of the modules and, responsive to the alarm, to construct a causal network associating the fault with malfunctions in one or more of the modules that may have led to the fault and relating a conditional probability of the fault to respective probabilities of the malfunctions, and based on the alarm and the causal network, to update at least one of the probabilities of the malfunctions so as to propose a diagnosis of the alarm responsive to the updated probabilities, wherein the instructions cause the computer to receive event reports from the plurality of the modules in the system, and to extract the alarm from the event reports, and wherein the instructions cause the computer to extract a sequence of alarms occurring at mutually proximal times, including the alarm indicative of the fault in the one of the modules, and to process the sequence of the alarms so as to update the probabilities.

58. A product according to claim 57, wherein the event reports comprise a report of a change in configuration of the system, and wherein the instructions cause the computer to construct the causal network based on the changed configuration.

59. A product according to claim 58, wherein the instructions cause the computer, responsive to the report of the change in the configuration, to update a database in which the configuration is recorded, for use in constructing the causal network.

60. A product according to claim 57, wherein respective lifetimes are defined for the alarms, responsive to expected delays in receiving the alarms from the system, and wherein the instructions cause the computer to select the alarms to extract from the sequence responsive to the respective lifetimes.

61. A product according to claim 60, wherein the instructions cause the computer to select the alarms that occurred within their respective lifetimes of a time of occurrence of the alarm indicative of the fault in the one of the modules responsive to which the causal network is constructed.

62. A product according claim 57, wherein the instructions cause the computer, in constructing the causal network, to define an expected alarm that would be caused by one of the malfunctions in the one or more of the modules, and to update the probabilities responsive to an occurrence of the expected alarm in the extracted sequence of alarms.

63. A product according to claim 57, wherein a template is defined comprising a group of nodes in the network corresponding to a category of the modules in the system and an expected alarm that would be caused by one of the malfunctions in the modules in the category, and wherein the instructions cause the computer to instantiate the template in the causal network responsive to an occurrence of the expected alarm in the extracted sequence of alarms.

64. A product according to claim 57, wherein the plurality of interlinked modules comprises multiple instances of a given one of the modules interlinked in a regular pattern, and wherein a template is defined comprising a group of nodes in the network corresponding to the given one of the modules, and wherein the instructions cause the computer to instantiate the template with respect to one or more of the modules responsive to the alarm.

65. A product according to claim 64, wherein the template comprises an expected alarm that would be caused by one of the malfunctions in one of the instances of the given one of the modules, and wherein the instructions cause the computer to instantiate the template by adding an instance of the template to the network responsive to an occurrence of the expected alarm.

66. A product according to claim 57, wherein the instructions cause the computer to identify a local fault condition in the one of the modules in which the fault occurred, and responsive to the local fault condition, to link the fault in the causal network to one of the malfunctions occurring in the one of the modules.

67. A product according to claim 57, wherein the instructions cause the computer to identify a first fault condition occurring in a first one of the modules due to a connection with a second one of the modules in the system, and responsive to the first fault condition, to link the fault in the causal network with a second fault condition occurring in the second one of the modules.

68. A product according to claim 67, wherein the instructions cause the computer to determine that a possible cause of the second fault condition is due a further connection between the second one of the modules and a third one of the modules in the system, and responsive to the further connection, to link the fault in the causal network with a third fault condition occurring in the third one of the modules.

69. A product according to claim 57, wherein the instructions cause the computer to add to the causal network multiple occurrences of one of the malfunctions responsive to the respective probabilities of the malfunctions, and to link the fault in the causal network to the multiple occurrences.

70. A product according to claim 69, wherein the instructions cause the computer to determine one or more fault conditions that are caused by each of the occurrences, and to link at least some of the fault conditions to the fault.

71. A product according to claim 57, wherein the at least one of the probabilities of the malfunctions is expressed as a mean time between failures of the one or more of the modules.

72. A product according to claim 57, wherein the probabilities of the malfunctions are defined in terms of a probability distribution having a mean and a moment, and wherein the instructions cause the computer to update the mean and the moment of the distribution.

73. A product according to claim 72, wherein the probability distribution comprises a failure rate distribution, and wherein the instructions cause the computer to update the failure rate distribution using a Bayesian Reliability Theory model.

74. A product according to claim 57, wherein the instructions cause the computer to compare one or more of the updated probabilities to a predetermined threshold, and to invoke diagnostic action when the one of the probabilities exceeds the threshold.

75. A product according to claim 74, and wherein the instructions cause the computer to notify a user of the system of the diagnosis.

76. A product according to claim 75, wherein the instructions cause the computer to provide to the user an explanation of the diagnosis based on the causal network.

77. A product according to claim 74, wherein the diagnostic action comprises a diagnostic test that is performed to verify the malfunctions, wherein the test is selected responsive to the one of the probabilities exceeding the threshold.

78. A product according to claim 77, wherein the instructions cause the computer to modify the causal network responsive to a result of the diagnostic test.

79. A product for diagnosis of a system made up of a plurality of interlinked modules, the product comprising a computer-readable medium in which program instructions are stored, which instructions, when read by a computer, cause the computer to construct a causal network associating a fault in one of the modules with malfunctions in two or more of the modules that may have led to the fault and relating a conditional probability of the fault to respective probability distributions of the malfunctions, and responsive to an alarm from the system indicative of the fault, to update the probability distributions of the malfunctions so as to propose a diagnosis of the alarm responsive to the updated probabilities, wherein the two or more of the modules comprise first and second modules, and wherein the instructions cause the computer to identify a first fault condition occurring in the first module due to a connection in the system with the second module, and responsive to the first fault condition, to link the fault in the causal network with a second fault condition occurring in the second module.

80. A product according to claim 79, wherein the probability distributions are indicative of a mean time between failures of the two or more of the modules.

81. A product according to claim 79, wherein the probability distributions have a mean and a moment, and wherein the instructions cause the computer to reassess the mean and the moment of the distribution responsive to the alarm.

82. A product according to claim 81, wherein the probability distributions comprise failure rate distributions, and wherein the instructions cause the computer to update the failure rate distributions using a Bayesian Reliability Theory model.

83. A product according to claim 79, wherein the two or more of the modules comprise the one of the modules in which the fault occurred, and wherein the instructions cause the computer to identify a local fault condition in the one of the modules, and responsive to the local fault condition, to link the fault in the causal network to one of the malfunctions occurring in the one of the modules.

84. A product according to claim 79, wherein the two or more of the modules comprise a third module, and wherein the instructions cause the computer to determine that a possible cause of the second fault condition is due a further connection in the system between the second module and the third module, and responsive to the further connection, to link the fault in the causal network with a third fault condition occurring in the third module.

\* \* \* \* \*